United States Patent
Tsai et al.

(10) Patent No.: US 9,258,835 B2
(45) Date of Patent: Feb. 9, 2016

(54) DIRECT MODE COMMUNICATION SYSTEM AND COMMUNICATION ATTACHING METHOD THEREOF

(71) Applicant: Institute For Information Industry, Taipei (TW)

(72) Inventors: Yi-Hsueh Tsai, New Taipei (TW); Hsien-Tsung Hsu, Taipei (TW); Kanchei Loa, Taipei (TW); Yi-Ting Lin, New Taipei (TW)

(73) Assignee: Institute For Information Industry, Taipei (TW)

( * ) Notice: Subject to any disclaimer, the term of this patent is extended or adjusted under 35 U.S.C. 154(b) by 363 days.

(21) Appl. No.: 13/886,056

(22) Filed: May 2, 2013

(65) Prior Publication Data
US 2013/0294432 A1   Nov. 7, 2013

Related U.S. Application Data

(60) Provisional application No. 61/642,466, filed on May 4, 2012, provisional application No. 61/672,785, filed on Jul. 18, 2012, provisional application No. 61/721,020, filed on Oct. 31, 2012.

(51) Int. Cl.
*H04W 76/02*   (2009.01)
*H04W 4/02*    (2009.01)
*H04W 64/00*   (2009.01)
*H04W 84/12*   (2009.01)

(52) U.S. Cl.
CPC .............. *H04W 76/023* (2013.01); *H04W 4/02* (2013.01); *H04W 64/00* (2013.01); *H04W 84/12* (2013.01)

(58) Field of Classification Search
None
See application file for complete search history.

(56) References Cited

U.S. PATENT DOCUMENTS

| 6,580,704 B1 | 6/2003 | Wellig et al. |
| 8,411,608 B2 | 4/2013 | Chandra et al. |

(Continued)

FOREIGN PATENT DOCUMENTS

| CN | 101043414 A | 9/2007 |
| TW | 201134162 A1 | 10/2011 |
| TW | 201136372 A1 | 10/2011 |

OTHER PUBLICATIONS

Office Action to the corresponding United States continuation-in-part U.S. Appl. No. 14/099,877 rendered by United States Patent and Trademark Office (USPTO) on Jul. 15, 2015, 20 pages.

(Continued)

*Primary Examiner* — Hong Cho
(74) *Attorney, Agent, or Firm* — Skaar Ulbrich Macari, P.A.

(57) ABSTRACT

A direct-mode communication system comprises a first client direct-mode communication apparatus and a backhaul network. The first client direct-mode communication apparatus transmits a register signal to the backhaul network to register with the backhaul network. After the first client direct-mode communication apparatus is registered, the backhaul network determines a location relationship between the first client direct-mode communication apparatus and a second client direct-mode communication apparatus, and transmits a wi-fi connection signal to the first client direct-mode communication apparatus according to the location relationship. The first client direct-mode communication apparatus creates a wi-fi direct-mode communication connection with the second client direct-mode communication apparatus according to the wi-fi connection signal.

22 Claims, 13 Drawing Sheets

(56) References Cited

U.S. PATENT DOCUMENTS

| | | |
|---|---|---|
| 2006/0034317 A1* | 2/2006 | Hong et al. .................. 370/445 |
| 2010/0254308 A1 | 10/2010 | Laroia et al. |
| 2010/0322146 A1* | 12/2010 | Liu et al. ..................... 370/315 |
| 2011/0082939 A1 | 4/2011 | Montemurro et al. |
| 2011/0252144 A1 | 10/2011 | Tung et al. |
| 2011/0258313 A1 | 10/2011 | Mallik et al. |
| 2012/0106475 A1 | 5/2012 | Jung |
| 2013/0102313 A1 | 4/2013 | Tinnakornsrisuphap et al. |
| 2013/0102314 A1* | 4/2013 | Koskela et al. ............... 455/436 |
| 2013/0287012 A1* | 10/2013 | Pragada et al. ............... 370/338 |

OTHER PUBLICATIONS

Office Action to the corresponding Chinese Patent Application rendered by State Intellectual Property Office of China (SIPO) on Aug. 5, 2015, 9 pages.

3rd Generation Partnership Project; Technical Specification Group SA; Feasibility Study for Proximity Services Release 12, 3GPP TR 22.803 V0.2.0, Feb. 2012, 16 pages.

Office Action to the corresponding Taiwan Patent Application rendered by Taiwan Intellectual Property Office (TIPO) on Apr. 17, 2015, 11 pages.

* cited by examiner

DIRECT MODE COMMUNICATION SYSTEM AND COMMUNICATION ATTACHING METHOD THEREOF

PRIORITY

This application claims the benefit of U.S. Provisional Application Ser. No. 61/642,466 filed on May 4, 2012, U.S. Provisional Application Ser. No. 61/672,785 filed on Jul. 18, 2012, and U.S. Provisional Application Ser. No. 61/721,020 filed on Oct. 31, 2012, each of which is hereby incorporated by reference herein in its entirety.

FIELD

The present invention relates to a direct-mode communication system and a communication attaching method thereof; and more particularly, the direct-mode communication system and the communication attaching method thereof allow client direct-mode communication apparatuses to create a wi-fi connection therebetween directly to increase the flexibility in use of the direct-mode communication system.

BACKGROUND

In a conventional direct-mode communication system, coordination must be carried out by a backhaul core network firstly in order to create a communication connection between client direct-mode communication apparatuses. Then, the communication connection can be created between the client direct-mode communication apparatuses for direct message transmission. In this way, data exchange can be accomplished more simply and quickly.

However, creation of the communication connection between the client direct-mode communication apparatuses may require use of an additional connection module and an additional communication protocol. This makes the hardware design more complex or makes the existing hardware of the communication apparatuses unable to support this.

Accordingly, an urgent need exists in the art to provide a solution that can create a communication connection between client direct-mode communication apparatuses more efficiently through use of the existing hardware modules but through adjustment of the communication protocol so as to increase the flexibility in use of the direct-mode communication system.

SUMMARY

To address the aforesaid problem, the present invention, in certain embodiments, provides a direct-mode communication system and a communication attaching method thereof. The direct-mode communication system and the communication attaching method thereof mainly allow client direct-mode communication apparatuses to create a wi-fi connection therebetween directly to increase the flexibility in use of the direct-mode communication system.

To achieve the aforesaid objective, certain embodiments of the present invention provide a communication attaching method for use in a direct-mode communication system. The direct-mode communication system comprises a first client direct-mode communication apparatus and a backhaul network. The first client direct-mode communication apparatus connects with the backhaul network. The communication attaching method comprises: (a) enabling the first client direct-mode communication apparatus to transmit a register signal to the backhaul network to register with the backhaul network; (b) enabling the backhaul network to determine a location relationship between the first client direct-mode communication apparatus and a second client direct-mode communication apparatus after the step (a); (c) enabling the backhaul network to transmit a wi-fi connection signal to the first client direct-mode communication apparatus according to the location relationship; and (d) enabling the first client direct-mode communication apparatus to create a wi-fi direct-mode communication connection with the second client direct-mode communication apparatus according to the wi-fi connection signal.

To achieve the aforesaid objective, certain embodiments of the present invention further provide a direct-mode communication system, which comprises a backhaul network and a first client direct-mode communication apparatus. The first client direct-mode communication apparatus connects with the backhaul network. The first client direct-mode communication apparatus transmits a register signal to the backhaul network to register with the backhaul network. The backhaul network determines a location relationship between the first client direct-mode communication apparatus and a second client direct-mode communication apparatus after the first client direct-mode communication apparatus has been registered and transmits a wi-fi connection signal to the first client direct-mode communication apparatus according to the location relationship. The first client direct-mode communication apparatus creates a wi-fi direct-mode communication connection with the second client direct-mode communication apparatus according to the wi-fi connection signal.

To achieve the aforesaid objective, certain embodiments of the present invention further provide a communication attaching method for use in a direct-mode communication system. The direct-mode communication system comprises a first client direct-mode communication apparatus, a first server direct-mode communication apparatus and a backhaul network. The first client direct-mode communication apparatus connects to the backhaul network via the first server direct-mode communication apparatus. The communication attaching method comprises: (a) enabling the first client direct-mode communication apparatus to transmit a register signal to the backhaul network via the first server direct-mode communication apparatus to register with the backhaul network; (b) enabling the backhaul network to transmit a piece of first apparatus information to the first server direct-mode communication apparatus after the step (a); (c) enabling the first server direct-mode communication apparatus to transmit a first client information request to the first client direct-mode communication apparatus according to the first apparatus information; (d) enabling the first client direct-mode communication apparatus to transmit a piece of first client information to the first server direct-mode communication apparatus according to the first client information request; (e) enabling the first server direct-mode communication apparatus to determine a location relationship between the first client direct-mode communication apparatus and a second client direct-mode communication apparatus according to the first client information; (f) enabling the first server direct-mode communication apparatus to transmit a wi-fi connection signal to the first client direct-mode communication apparatus according to the location relationship; and (g) enabling the first client direct-mode communication apparatus to create a wi-fi direct-mode communication connection with the second client direct-mode communication apparatus according to the wi-fi connection signal.

To achieve the aforesaid objective, certain embodiments of the present invention further provide a direct-mode communication system, which comprises a backhaul network, a first client direct-mode communication apparatus and a first server direct-mode communication apparatus. The first client direct-mode communication apparatus connects to the backhaul network via the first server direct-mode communication apparatus. The first client direct-mode communication apparatus transmits a register signal to the backhaul network via the first server direct-mode communication apparatus to register with the backhaul network. The backhaul network transmits a piece of first apparatus information to the first server direct-mode communication apparatus after the first client direct-mode communication apparatus has been registered. The first server direct-mode communication apparatus transmits a first client information request to the first client direct-mode communication apparatus according to the first apparatus information. The first client direct-mode communication apparatus transmits a piece of first client information to the first server direct-mode communication apparatus according to the first client information request. The first server direct-mode communication apparatus determines a location relationship between the first client direct-mode communication apparatus and a second client direct-mode communication apparatus according to the first client information. The first server direct-mode communication apparatus transmits a wi-fi connection signal to the first client direct-mode communication apparatus according to the location relationship. The first client direct-mode communication apparatus creates a wi-fi direct-mode communication connection with the second client direct-mode communication apparatus according to the wi-fi connection signal.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. However, these example embodiments are not intended to limit the present invention to any specific example, embodiments, environment, applications or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction, and dimensional relationships among the individual elements in the attached drawings are illustrated only for the ease of understanding, but not to limit the actual scale.

Figure 1A:
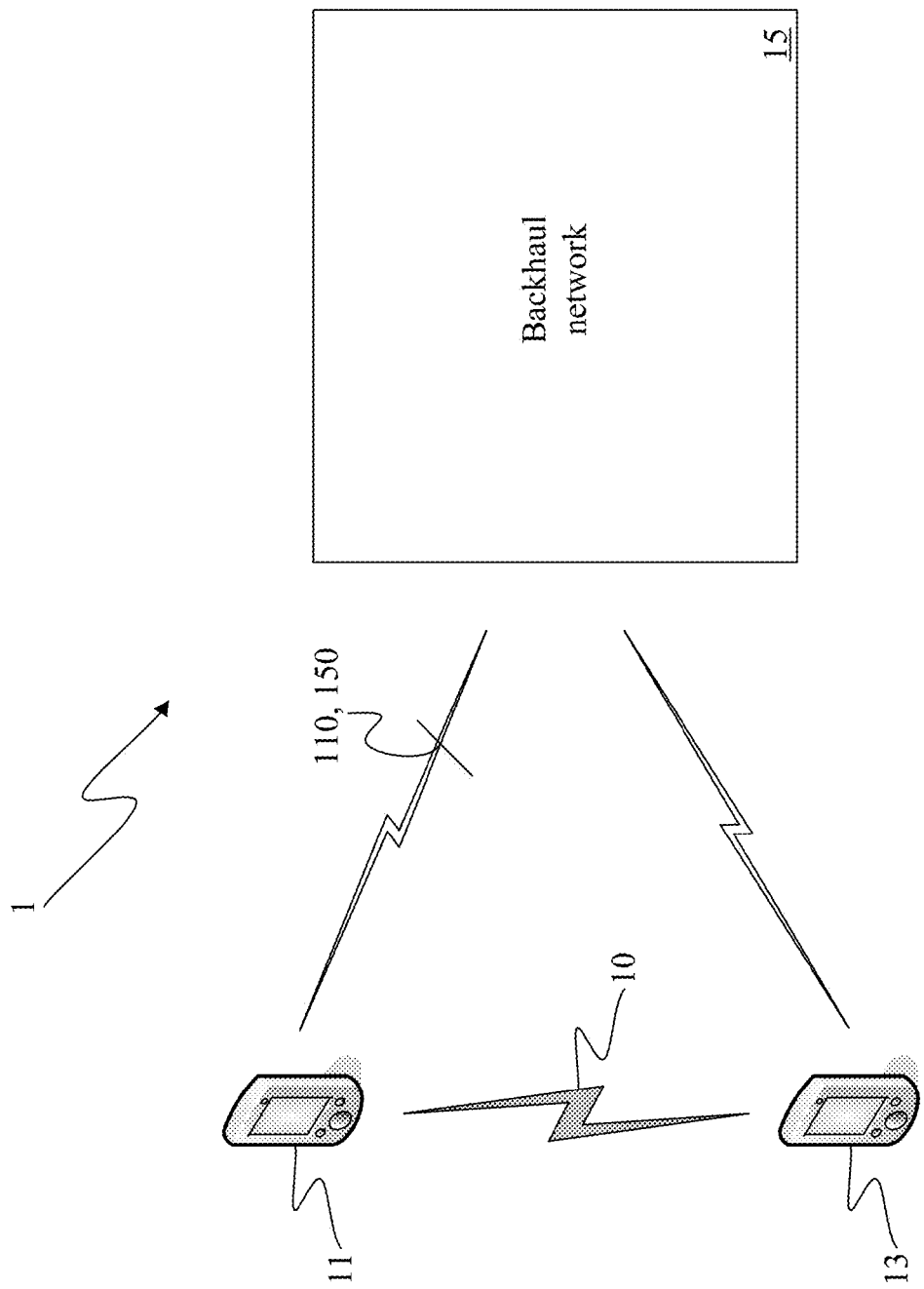
FIG. 1A is a schematic view of a direct-mode communication system according to a first embodiment of the present invention.
Figure 1B:
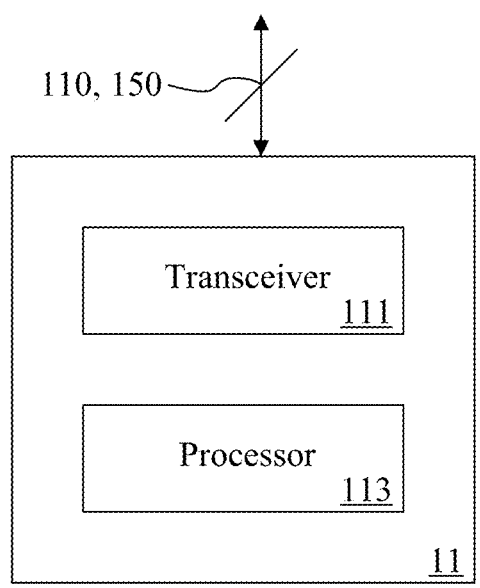
FIG. 1B is a schematic view of a first client direct-mode communication apparatus according to the first embodiment of the present invention.

Referring to FIG. 1A-1B, FIG. 1A is a schematic view of a direct-mode communication system 1 according to a first embodiment of the present invention, and FIG. 1B is a schematic view of a first client direct-mode communication apparatus 11 according to the first embodiment of the present invention. The direct-mode communication system 1 at least comprises a first client direct-mode communication apparatus 11 and a backhaul network 15 connecting with the first client direct-mode communication apparatus 11. The first client direct-mode communication apparatus 11 comprises a transceiver 111 and a processor 113. Interactions between individual network components will be further described hereinafter.

First, the first client direct-mode communication apparatus 11 must register with the backhaul network 15 firstly in order to create a communication connection with other client direct-mode communication apparatuses in the direct-mode communication system 1. Accordingly, the transceiver 111 of the first client direct-mode communication apparatus 11 transmits a register signal 110 to the backhaul network 15 to register with the backhaul network 15.

Subsequently, since the backhaul network 15 can register other client direct-mode communication apparatuses in the aforesaid manner, the backhaul network 15 can record information related to all client direct-mode communication apparatuses in the direct-mode communication system 1 and determine whether the client direct-mode communication apparatuses that can connect with each other are within each other's communication coverage according to the information. In particular, after the first client direct-mode communication apparatus 11 is registered, the backhaul network 15 can determine a location relationship between the first client direct-mode communication apparatus 11 and a second client direct-mode communication apparatus 13 that can connect with the first client direct-mode communication apparatus 11.

Then, after the backhaul network 15 determines, according to the location relationship, that the first client direct-mode communication apparatus 11 and the second client direct-mode communication apparatus 13 are within each other's communication coverage and are ready to perform a discovery interaction, the backhaul network 15 can transmit a wi-fi connection signal 150 to the first client direct-mode communication apparatus 11 to notify the first client direct-mode communication apparatus 11 that a wi-fi communication connection with the second client direct-mode communication apparatus 13 can be created later.

Further speaking, once the wi-fi connection signal 150 is received by the transceiver 111 of the first client direct-mode communication apparatus 11, the first client direct-mode communication apparatus 11 can create a wi-fi direct-mode communication connection with the second client direct-mode communication apparatus 13. Accordingly, the processor 113 of the first client direct-mode communication apparatus 11 can create a wi-fi direct-mode communication connection 10 directly with the second client direct-mode communication apparatus 13 through use of the transceiver 111 so that the two client direct-mode communication apparatuses can exchange data with each other subsequently.

Figure 2:
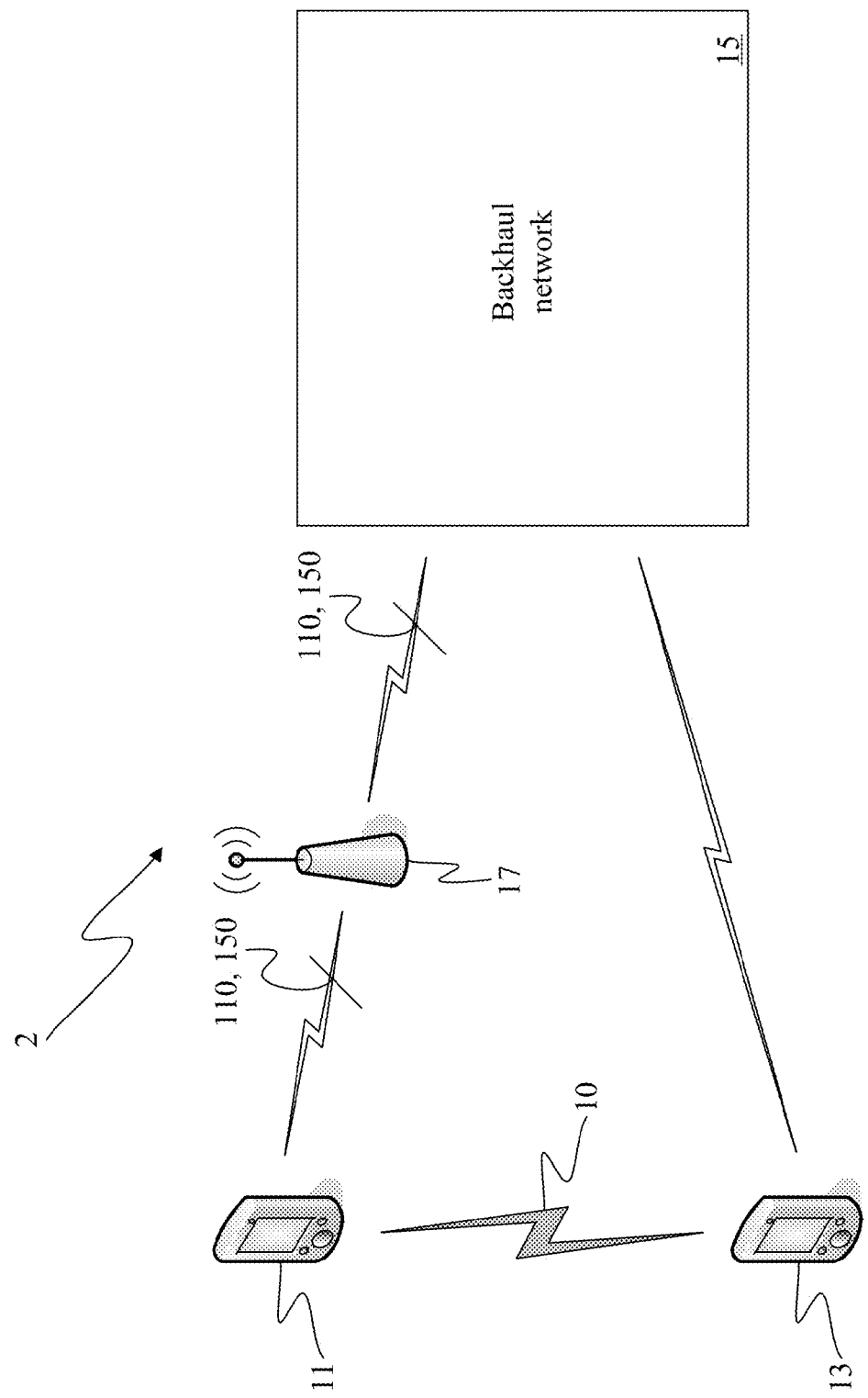
FIG. 2 is a schematic view of a direct-mode communication system according to a second embodiment of the present invention.

Referring to FIG. 2, it is a schematic view of a direct-mode communication system 2 according to a second embodiment of the present invention. The direct-mode communication system 2 further comprises a first server direct-mode communication apparatus 17. It should be appreciated that, the system architecture and the network connection environment in the second embodiment are the same as those in the previous embodiment, so elements with the same reference numerals also have the same functions and will not be described again herein. However, the second embodiment is different from the previous embodiment in that, the first client direct-mode communication apparatus 11 connects to the backhaul network 15 via the first server direct-mode communication apparatus 17 in the second embodiment.

In particular, the first client direct-mode communication apparatus 11 must register with the backhaul network 15 firstly in order to create a communication connection with other client direct-mode communication apparatuses in the direct-mode communication system 1. Therefore, the transceiver 111 of the first client direct-mode communication apparatus 11 transmits the register signal 110 to the backhaul network 15 via the first server direct-mode communication apparatus 17 to register with the backhaul network 15.

Likewise, after the first client direct-mode communication apparatus 11 is registered, the backhaul network 15 can determine the location relationship between the first client direct-mode communication apparatus 11 and the second client direct-mode communication apparatus 13 that can connect with the first client direct-mode communication apparatus 11 and, according to the location relationship, determine that the first client direct-mode communication apparatus 11 and the second client direct-mode communication apparatus 13 are within each other's communication coverage and are ready to perform the discovery interaction.

Similarly, the backhaul network 15 can then transmit the wi-fi connection signal 150 to the first client direct-mode communication apparatus 11 via the first server direct-mode communication apparatus 17 to notify the first client direct-mode communication apparatus 11 that a wi-fi communication connection with the second client direct-mode communication apparatus 13 can be created later. Likewise, the processor 113 of the first client direct-mode communication apparatus 11 can create the wi-fi direct-mode communication connection 10 directly with the second client direct-mode communication apparatus 13 via the transceiver 111 after the wi-fi connection signal 150 is received by the transceiver 111 of the first client direct-mode communication apparatus 11.

Figure 3:
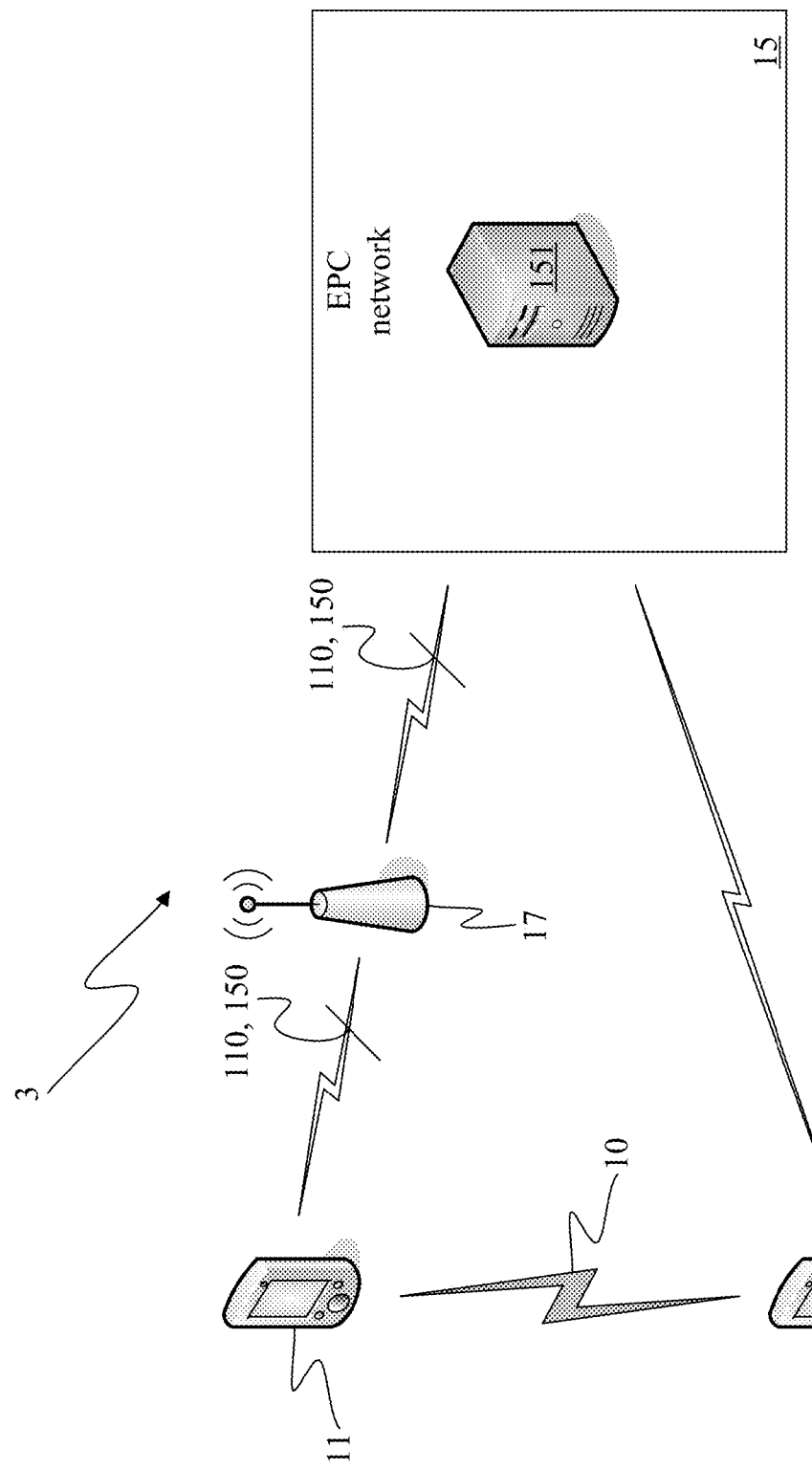
FIG. 3 is a schematic view of a direct-mode communication system according to a third embodiment of the present invention.

Referring to FIG. 3, it is a schematic view of a direct-mode communication system 3 according to a third embodiment of the present invention. It should be appreciated that, the system architecture and the network connection environment in the third embodiment are the same as those in the previous embodiments, so elements with the same reference numerals also have the same functions and will not be described again. However, the third embodiment is different from the previous embodiments in that, the backhaul network 15 is an Evolved Packet Core (EPC) network which comprises a proximity service (ProSe) server 151.

It should be emphasized that, the ProSe server is a server that mainly provides proximity-based services and controls related signals, and is used to accomplish the following services: application enablement, network communication selection, network security, lawful interception, proximity-based service discovery, direct proximity-based service communication, interworking between device discovery and service discovery, and so on. The contents of these services provided by the ProSe server can be appreciated by people skilled in the art and, thus, will not be further described herein.

In particular, in the third embodiment, the first client direct-mode communication apparatus 11 must register with the ProSe server 151 of the backhaul network (i.e., the EPC network) 15 firstly in order to create the communication connection with other client direct-mode communication apparatuses in the direct-mode communication system 1. Therefore, the transceiver 111 of the first client direct-mode communication apparatus 11 transmits the register signal 110 to the ProSe server 151 of the backhaul network (i.e., the EPC network) 15 via the first server direct-mode communication apparatus 17 to register with the ProSe server 151 of the backhaul network (i.e., the EPC network) 15.

Likewise, after the first client direct-mode communication apparatus 11 is registered, the ProSe server 151 of the backhaul network (i.e., the EPC network) 15 can determine the location relationship between the first client direct-mode communication apparatus 11 and the second client direct-mode communication apparatus 13 that can connect with the first client direct-mode communication apparatus 11 and, according to the location relationship, determine that the first client direct-mode communication apparatus 11 and the second client direct-mode communication apparatus 13 are within each other's communication coverage and are ready to perform the discovery interaction.

Similarly, the ProSe server 151 of the backhaul network (i.e., the EPC network) 15 can then transmit the wi-fi connection signal 150 to the first client direct-mode communication apparatus 11 via the first server direct-mode communication apparatus 17 to notify the first client direct-mode communication apparatus 11 that a wi-fi communication connection with the second client direct-mode communication apparatus 13 can be created later. Likewise, the processor 113 of the first client direct-mode communication apparatus 11 can create the wi-fi direct-mode communication connection 10 directly with the second client direct-mode communication apparatus 13 via the transceiver 111 after the wi-fi connection signal 150 is received by the transceiver 111 of the first client direct-mode communication apparatus 11.

Figure 4:
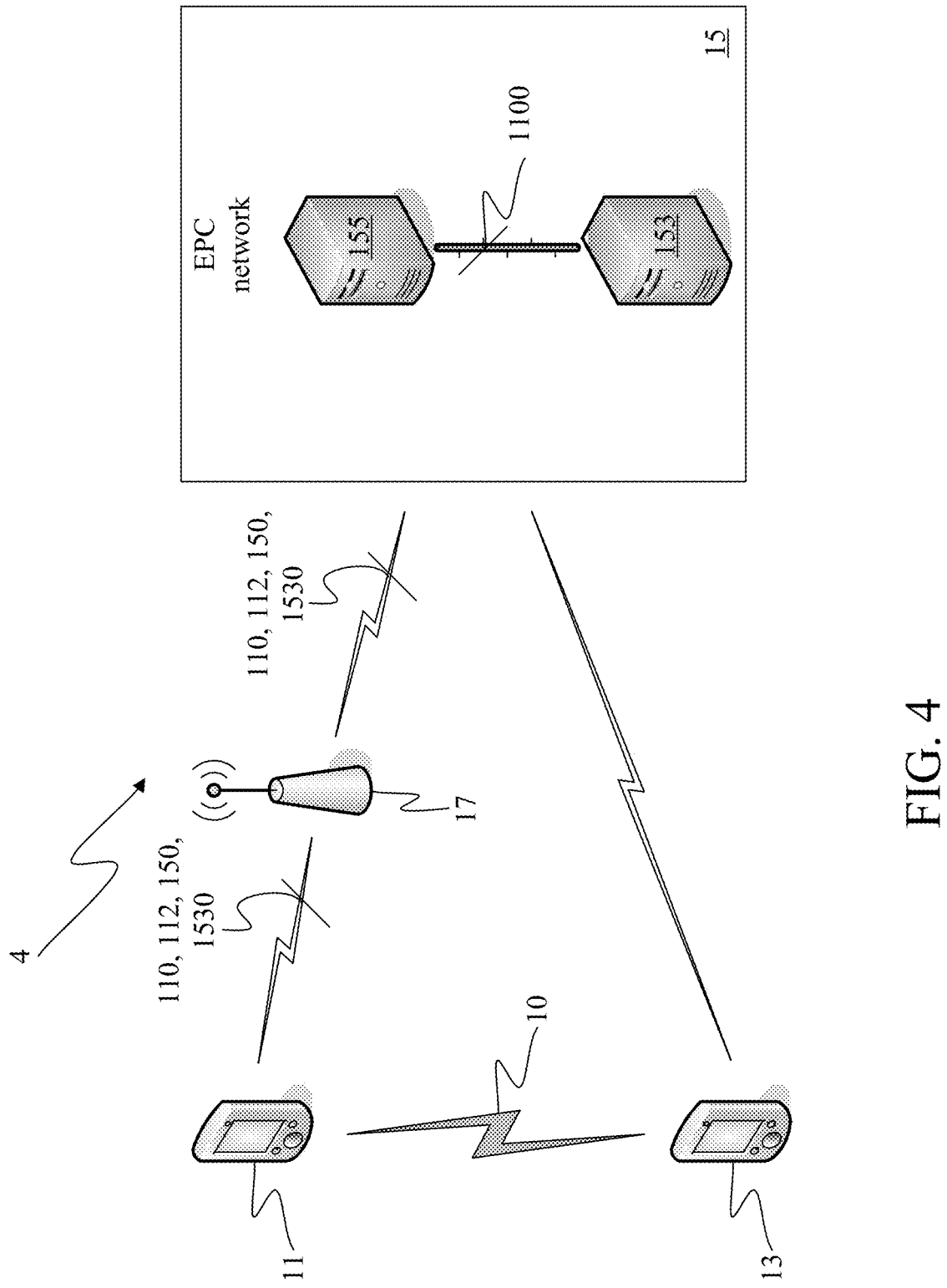
FIG. 4 is a schematic view of a direct-mode communication system according to a fourth embodiment of the present invention.

Referring to FIG. 4, it is a schematic view of a direct-mode communication system 4 according to a fourth embodiment of the present invention. It should be appreciated that, the system architecture and the network connection environment in the fourth embodiment are the same as those in the previous embodiments, so elements with the same reference numerals also have the same functions and will not be described again herein. However, the fourth embodiment is different from the previous embodiments in that, the backhaul network 15 is an EPC network which comprises an apparatus locating server 153 and a 3$^{rd}$ Generation Partnership Project Authentication Authorization and Accounting (3GPP AAA) server 155.

In particular, in the fourth embodiment, the first client direct-mode communication apparatus 11 must register with the 3GPP AAA server 155 of the backhaul network (i.e., the EPC network) 15 firstly in order to create the communication connection with other client direct-mode communication apparatuses in the direct-mode communication system 1. Therefore, the transceiver 111 of the first client direct-mode communication apparatus 11 transmits the register signal 110 to the 3GPP AAA server 155 of the backhaul network (i.e., the EPC network) 15 via the first server direct-mode communication apparatus 17 to register with the 3GPP AAA server 155 of the backhaul network (i.e., the EPC network) 15.

After the first client direct-mode communication apparatus 11 is registered, the 3GPP AAA server 155 of the backhaul network (i.e., the EPC network) 15 can obtain a piece of first apparatus information 1100 related to the first client direct-mode communication apparatus 11. Then, the 3GPP AAA server 155 transmits the first apparatus information 1100 to the apparatus locating server 153 of the backhaul network (i.e., the EPC network) 15 to notify the apparatus locating server 153 of the presence of the first client direct-mode communication apparatus 11.

Then, the apparatus locating server 153 of the backhaul network (i.e., the EPC network) 15 transmits a first client information request 1530 to the first client direct-mode communication apparatus 11 via the first server direct-mode communication apparatus 17 according to the first apparatus information 1100 to request the first client direct-mode communication apparatus 11 to report its location.

After receiving the first client information request 1530, the transceiver 111 of the first client direct-mode communication apparatus 11 transmits a piece of first client information 112 to the apparatus locating server 153 of the backhaul network (i.e., the EPC network) 15 via the first server direct-mode communication apparatus 17. Accordingly, the apparatus locating server 153 can determine the location relationship between the first client direct-mode communication apparatus 11 and the second client direct-mode communication apparatus 13 that can connect with the first client direct-mode communication apparatus 11 and, according to the location relationship, determine that the first client direct-mode communication apparatus 11 and the second client direct-mode communication apparatus 13 are within each other's communication coverage and are ready to perform the discovery interaction.

Similarly, the apparatus locating server 153 of the backhaul network (i.e., the EPC network) 15 can then transmit the wi-fi connection signal 150 to the first client direct-mode communication apparatus 11 via the first server direct-mode communication apparatus 17 to notify the first client direct-mode communication apparatus 11 that a wi-fi communication connection with the second client direct-mode communication apparatus 13 can be created later. Likewise, the processor 113 of the first client direct-mode communication apparatus 11 can create the wi-fi direct-mode communication connection 10 directly with the second client direct-mode communication apparatus 13 via the transceiver 111 after the wi-fi connection signal 150 is received by the transceiver 111 of the first client direct-mode communication apparatus 11.

It should be emphasized that, the fourth embodiment is mainly intended to separate the register procedure and the locating function from each other in the backhaul network. The register procedure is accomplished mainly by the 3GPP AAA server, while the locating function can be accomplished by the ProSe server or by a Gateway Mobile Location Center (GMLC) server. However, this is not intended to limit the implementations of the backhaul network according to the present invention, and other possible replacements of components may be devised by people skilled in the art according to the aforesaid descriptions of the present invention.

Figure 5:
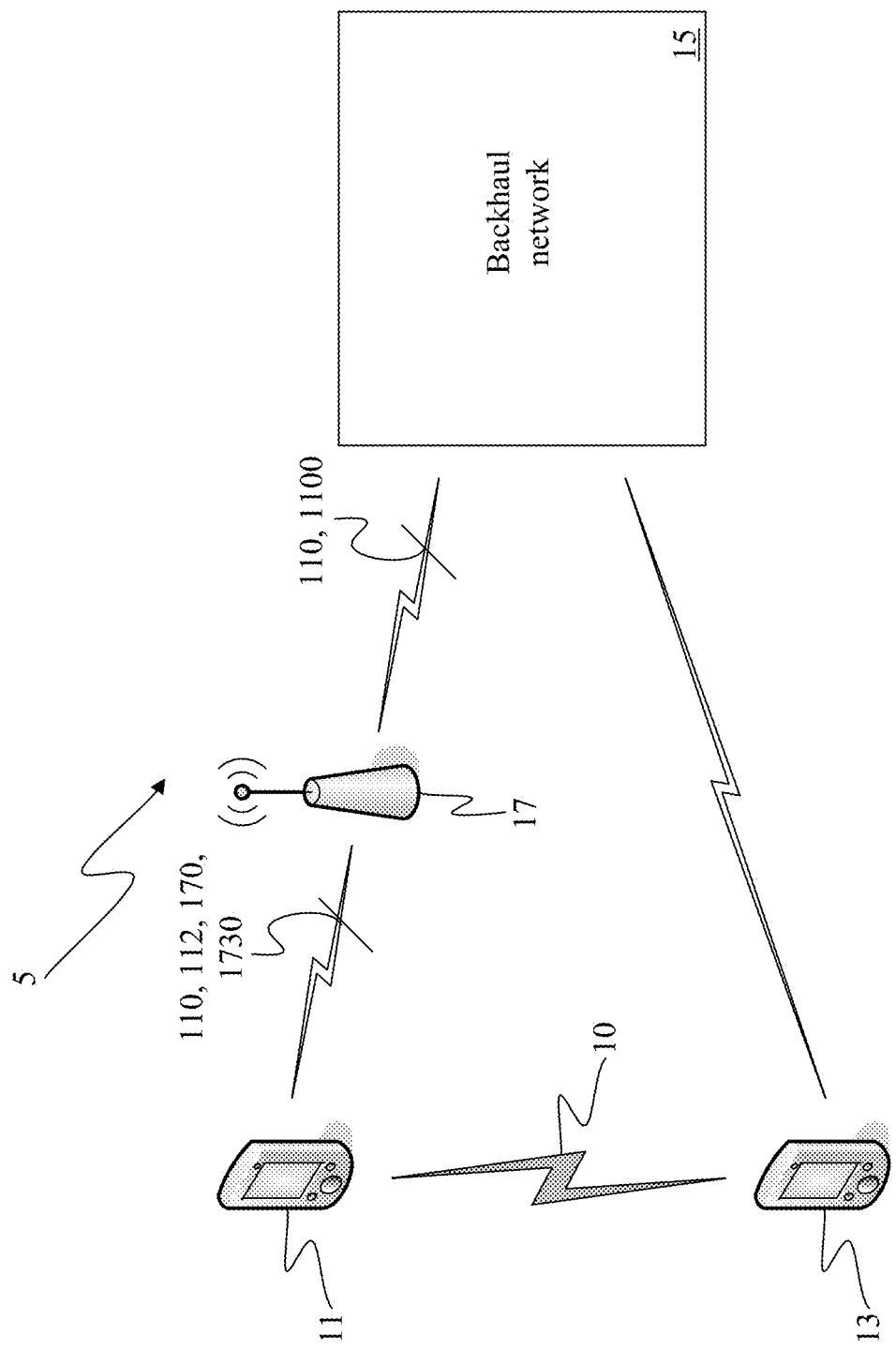
FIG. 5 is a schematic view of a direct-mode communication system according to a fifth embodiment of the present invention.

It should be further appreciated that, in other implementations, the location relationship between client direct-mode communication apparatuses and the wi-fi connection signal may also be governed by the server direct-mode communication apparatus. Referring to FIG. 5, it is a schematic view of a direct-mode communication system 5 according to a fifth embodiment of the present invention. It should be appreciated that, the system architecture and the network connection environment in the fifth embodiment are the same as those in the previous embodiments, so elements with the same reference numerals also have the same functions and will not be described again herein.

In particular, the first client direct-mode communication apparatus 11 must also register with the backhaul network 15 firstly in order to create the communication connection with other client direct-mode communication apparatuses in the direct-mode communication system 1. Therefore, the transceiver 111 of the first client direct-mode communication apparatus 11 transmits the register signal 110 to the backhaul network 15 via the first server direct-mode communication apparatus 17 to register with the backhaul network 15. Then, the backhaul network 15 can obtain the first apparatus information 1100 related to the first client direct-mode communication apparatus 11.

Subsequently, by transmitting the first apparatus information 1100 to the first server direct-mode communication apparatus 17, the backhaul network 15 transmits the client related information to the first server direct-mode communication apparatus 17 and notifies the first server direct-mode communication apparatus 17 to be responsible for determining the location relationship between client direct-mode communication apparatuses. Further speaking, after receiving the first apparatus information 1100, the first server direct-mode communication apparatus 17 transmits a first client information request 1730 to the first client direct-mode communication apparatus 11 to request the first client direct-mode communication apparatus 11 to report its location.

After receiving the first client information request 1730, the transceiver 111 of the first client direct-mode communication apparatus 11 transmits the first client information 112 to the first server direct-mode communication apparatus 17. Accordingly, the first server direct-mode communication apparatus 17 can determine the location relationship between the first client direct-mode communication apparatus 11 and the second client direct-mode communication apparatus 13 that can connect with the first client direct-mode communication apparatus 11 according to the first client information 112 and, according to the location relationship, determine that the first client direct-mode communication apparatus 11 and the second client direct-mode communication apparatus 13 are within each other's communication coverage and are ready to perform the discovery interaction.

Similarly, the first server direct-mode communication apparatus 17 can then transmit a wi-fi connection signal 170 to the first client direct-mode communication apparatus 11 to notify the first client direct-mode communication apparatus 11 that a wi-fi communication connection with the second client direct-mode communication apparatus 13 can be created later. Likewise, the processor 113 of the first client direct-mode communication apparatus 11 can create the wi-fi direct-mode communication connection 10 directly with the second client direct-mode communication apparatus 13 via the transceiver 111 after the wi-fi connection signal 170 is received by the transceiver 111 of the first client direct-mode communication apparatus 11.

Figure 6:
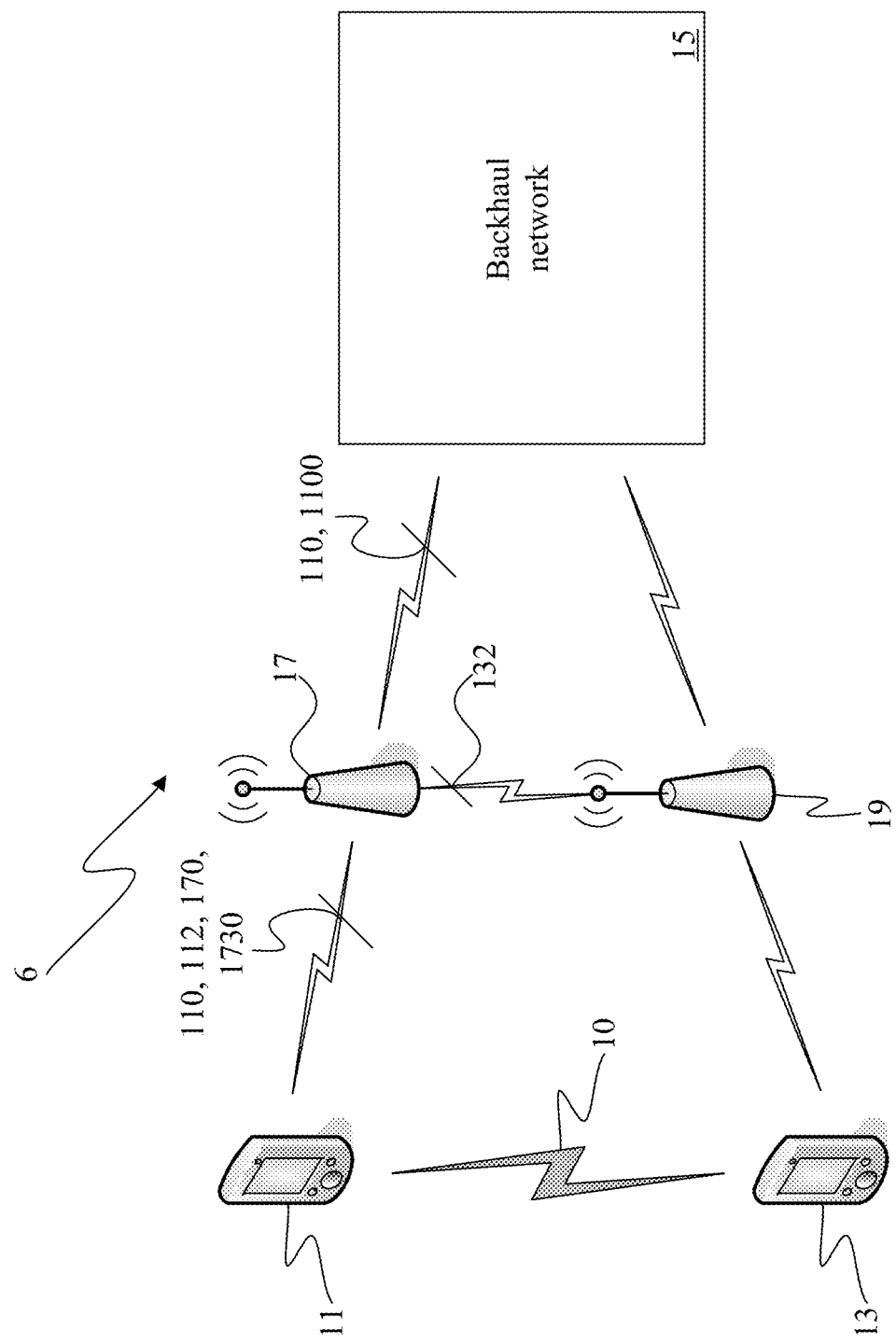
FIG. 6 is a schematic view of a direct-mode communication system according to a sixth embodiment of the present invention.

Referring to FIG. 6, it is a schematic view of a direct-mode communication system 6 according to a sixth embodiment of the present invention. It should be appreciated that, the system architecture and the network connection environment in the sixth embodiment are the same as those in the previous embodiments, so elements with the same reference numerals also have the same functions and will not be described again herein. However, the sixth embodiment is different from the previous embodiments in that, the sixth embodiment describes in detail how to determine the location relationship between the first client direct-mode communication apparatus 11 and the second client direct-mode communication apparatus 13 that can connect with the first client direct-mode communication apparatus 11.

In particular, the first client direct-mode communication apparatus 11 must also register with the backhaul network 15 firstly in order to create the communication connection with other client direct-mode communication apparatuses in the direct-mode communication system 1. Therefore, the transceiver 111 of the first client direct-mode communication apparatus 11 transmits the register signal 110 to the backhaul network 15 via the first server direct-mode communication apparatus 17 to register with the backhaul network 15. Then, the backhaul network 15 can obtain the first apparatus information 1100 related to the first client direct-mode communication apparatus 11.

Subsequently, by transmitting the first apparatus information 1100 to the first server direct-mode communication apparatus 17, the backhaul network 15 transmits the client related information to the first server direct-mode communication apparatus 17 and notifies the first server direct-mode communication apparatus 17 to be responsible for determining the location relationship between client direct-mode communication apparatuses. Further speaking, after receiving the first apparatus information 1100, the first server direct-mode communication apparatus 17 transmits a first client information request 1730 to the first client direct-mode communication apparatus 11 to request the first client direct-mode communication apparatus 11 to report its location.

After receiving the first client information request 1730, the transceiver 111 of the first client direct-mode communication apparatus 11 transmits the first client information 112 to the first server direct-mode communication apparatus 17. Simultaneously, the first server direct-mode communication apparatus 17 further receives a piece of second client information 132 of the second client direct-mode communication apparatus 13 from a second server direct-mode communication apparatus 19. Further speaking, the first server direct-mode communication apparatus 17 and the second server direct-mode communication apparatus 19 can exchange information with each other to obtain data related to their respective client direct-mode communication apparatuses.

Accordingly, the first server direct-mode communication apparatus 17 can determine the location relationship between the first client direct-mode communication apparatus 11 and the second client direct-mode communication apparatus 13 that can connect with the first client direct-mode communication apparatus 11 according to both the first client information 112 and the second client information 132 and, according to the location relationship, determine that the first client direct-mode communication apparatus 11 and the second client direct-mode communication apparatus 13 are within each other's communication coverage and are ready to perform the discovery interaction.

Similarly, the first server direct-mode communication apparatus 17 can then transmit a wi-fi connection signal 170 to the first client direct-mode communication apparatus 11 to notify the first client direct-mode communication apparatus 11 that a wi-fi communication connection with the second client direct-mode communication apparatus 13 can be created later. Likewise, the processor 113 of the first client direct-mode communication apparatus 11 can create the wi-fi direct-mode communication connection 10 directly with the second client direct-mode communication apparatus 13 via the transceiver 111 after the wi-fi connection signal 170 is received by the transceiver 111 of the first client direct-mode communication apparatus 11.

It should be appreciated that, in this embodiment, the server direct-mode communication apparatus may be a server apparatus that is common in wireless LANs (WLANs), such as an access point (AP), an evolved nodeB (eNB) or the like. However, it is not intended to limit the hardware implementations of the present invention.

Figure 7:
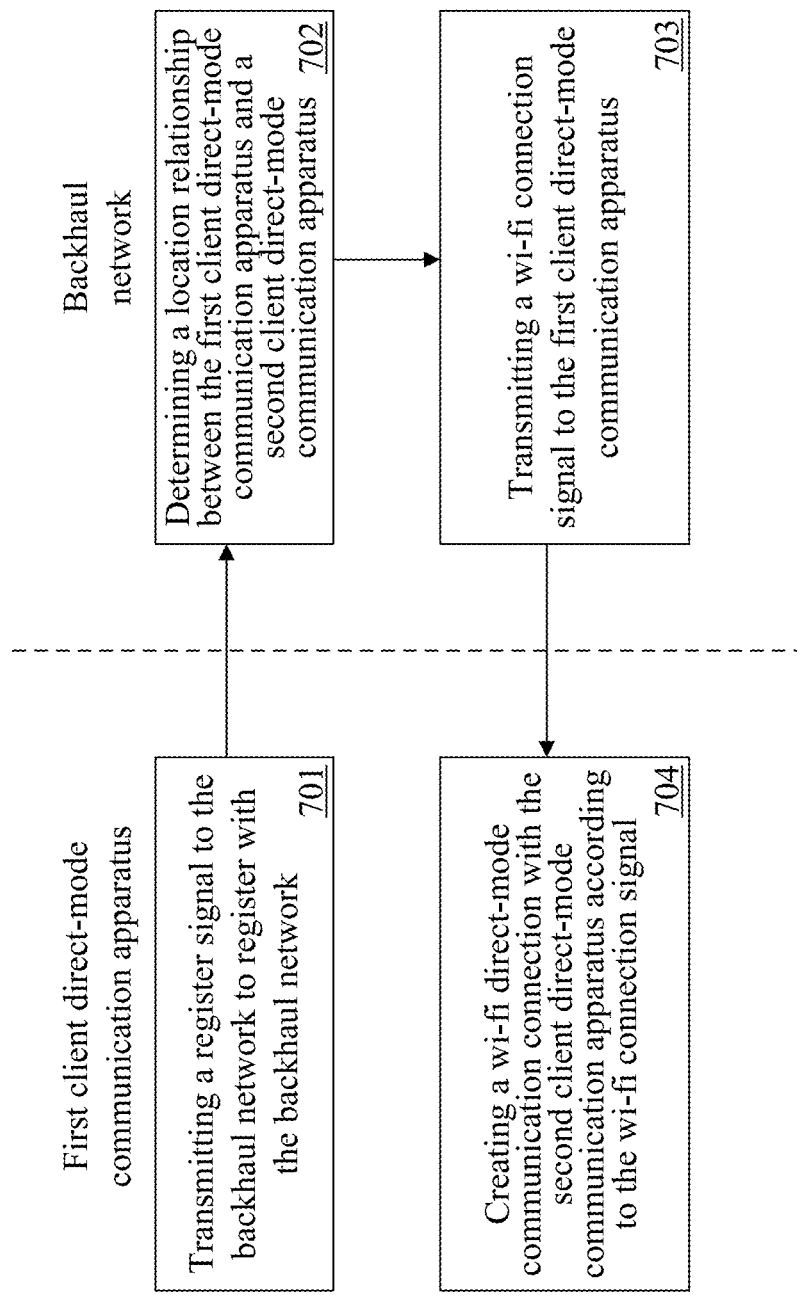
FIG. 7 is a flowchart diagram of a communication attaching method according to a seventh embodiment of the present invention.

A seventh embodiment of the present invention is a communication attaching method, a flowchart diagram of which is shown in FIG. 7. The method of the seventh embodiment is for use in a direct-mode communication system (e.g., the direct-mode communication system 1 of the aforesaid embodiment) as well as a first client direct-mode communication apparatus and a backhaul network (e.g., the first client direct-mode communication apparatus 11 and the backhaul network 15) comprised in the direct-mode communication system. The first client direct-mode communication apparatus connects with the backhaul network. The detailed steps of the seventh embodiment are as follows.

Firstly, step 701 is executed to enable the first client direct-mode communication apparatus to transmit a register signal to the backhaul network to register with the backhaul network. Then, step 702 is executed to enable the backhaul network to determine a location relationship between the first client direct-mode communication apparatus and a second client direct-mode communication apparatus after the first client direct-mode communication apparatus is registered.

Subsequently, step 703 is executed to enable the backhaul network to transmit a wi-fi connection signal to the first client direct-mode communication apparatus according to the location relationship. Finally, step 704 is executed to enable the first client direct-mode communication apparatus to create a wi-fi direct-mode communication connection with the second client direct-mode communication apparatus according to the wi-fi connection signal.

Figure 8:
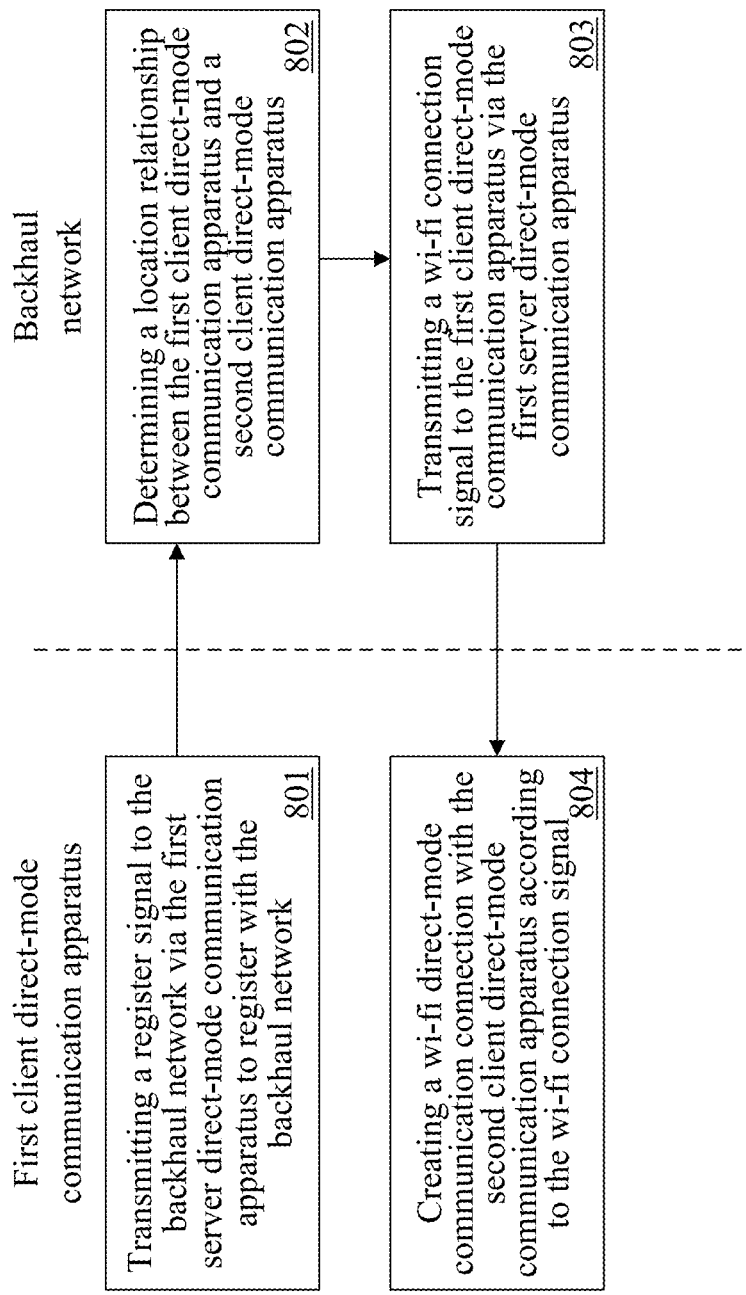
FIG. 8 is a flowchart diagram of a communication attaching method according to an eighth embodiment of the present invention.

An eighth embodiment of the present invention is a communication attaching method, a flowchart diagram of which is shown in FIG. 8. The method of the eighth embodiment is for use in a direct-mode communication system (e.g., the direct-mode communication system 2 of the aforesaid embodiment) as well as a first client direct-mode communication apparatus, a first server direct-mode communication apparatus and a backhaul network (e.g., the first client direct-mode communication apparatus 11, the backhaul network 15 and the first server direct-mode communication apparatus 17 of the aforesaid embodiments) comprised in the direct-mode communication system. The first client direct-mode communication apparatus connects with the backhaul network via the first server direct-mode communication apparatus. The detailed steps of the eighth embodiment are as follows.

Firstly, step 801 is executed to enable the first client direct-mode communication apparatus to transmit a register signal to the backhaul network via the first server direct-mode communication apparatus to register with the backhaul network. Then, step 802 is executed to enable the backhaul network to determine a location relationship between the first client direct-mode communication apparatus and a second client direct-mode communication apparatus after the first client direct-mode communication apparatus is registered.

Subsequently, step 803 is executed to enable the backhaul network to transmit a wi-fi connection signal to the first client direct-mode communication apparatus via the first server direct-mode communication apparatus according to the location relationship. Finally, step 804 is executed to enable the first client direct-mode communication apparatus to create a wi-fi direct-mode communication connection with the second client direct-mode communication apparatus according to the wi-fi connection signal.

Figure 9:
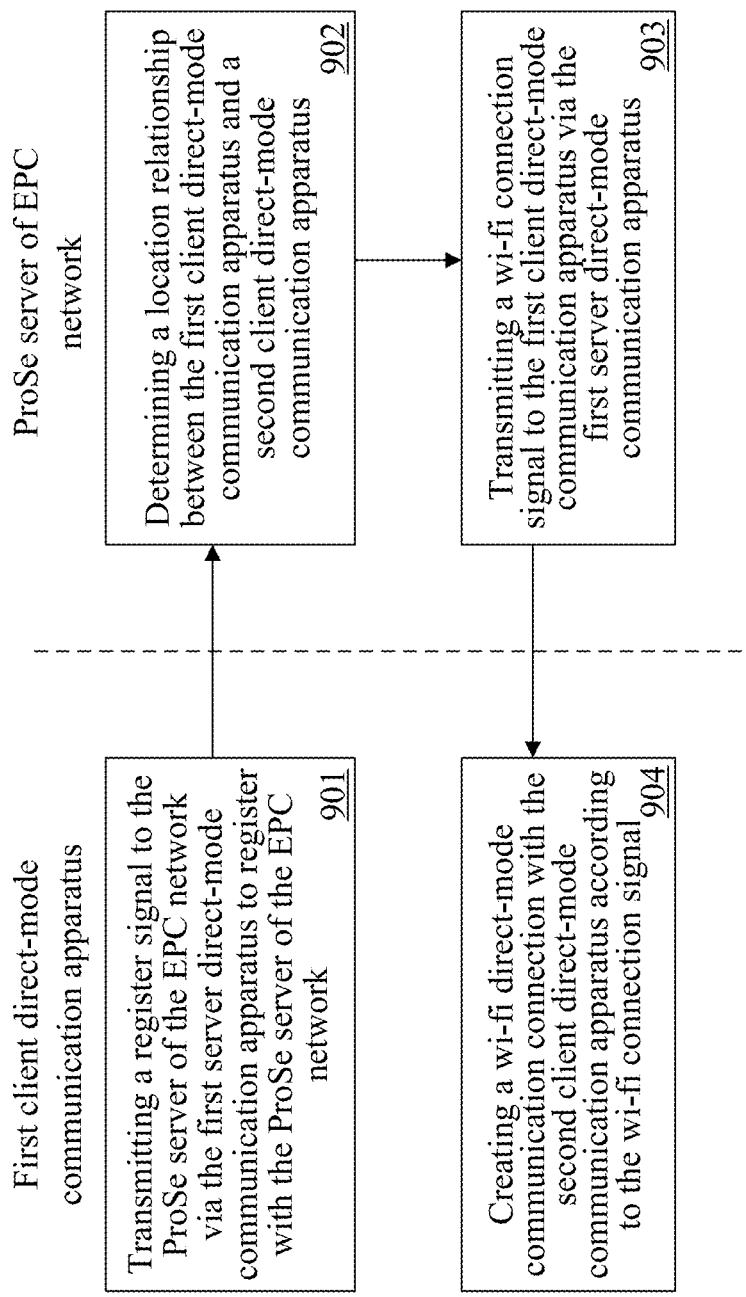
FIG. 9 is a flowchart diagram of a communication attaching method according to a ninth embodiment of the present invention.

A ninth embodiment of the present invention is a communication attaching method, a flowchart diagram of which is shown in FIG. 9. The method of the ninth embodiment is for use in a direct-mode communication system (e.g., the direct-mode communication system 3 of the aforesaid embodiment) as well as a first client direct-mode communication apparatus, a first server direct-mode communication apparatus and a backhaul network (e.g., the first client direct-mode communication apparatus 11, the backhaul network 15 and the first server direct-mode communication apparatus 17 of the aforesaid embodiments) comprised in the direct-mode communication system. The first client direct-mode communication apparatus connects with the backhaul network via the first server direct-mode communication apparatus. The backhaul network of the ninth embodiment is an EPC network which comprises a ProSe server. The detailed steps of the ninth embodiment are as follows.

Firstly, step 901 is executed to enable the first client direct-mode communication apparatus to transmit a register signal to the ProSe server of the EPC network via the first server direct-mode communication apparatus to register with the ProSe server. Then, step 902 is executed to enable the ProSe server of the EPC network to determine a location relationship between the first client direct-mode communication apparatus and a second client direct-mode communication apparatus after the first client direct-mode communication apparatus is registered.

Subsequently, step 903 is executed to enable the ProSe server of the EPC network to transmit a wi-fi connection signal to the first client direct-mode communication apparatus according to the location relationship. Finally, step 904 is executed to enable the first client direct-mode communication apparatus to create a wi-fi direct-mode communication connection with the second client direct-mode communication apparatus according to the wi-fi connection signal.

Figure 10:
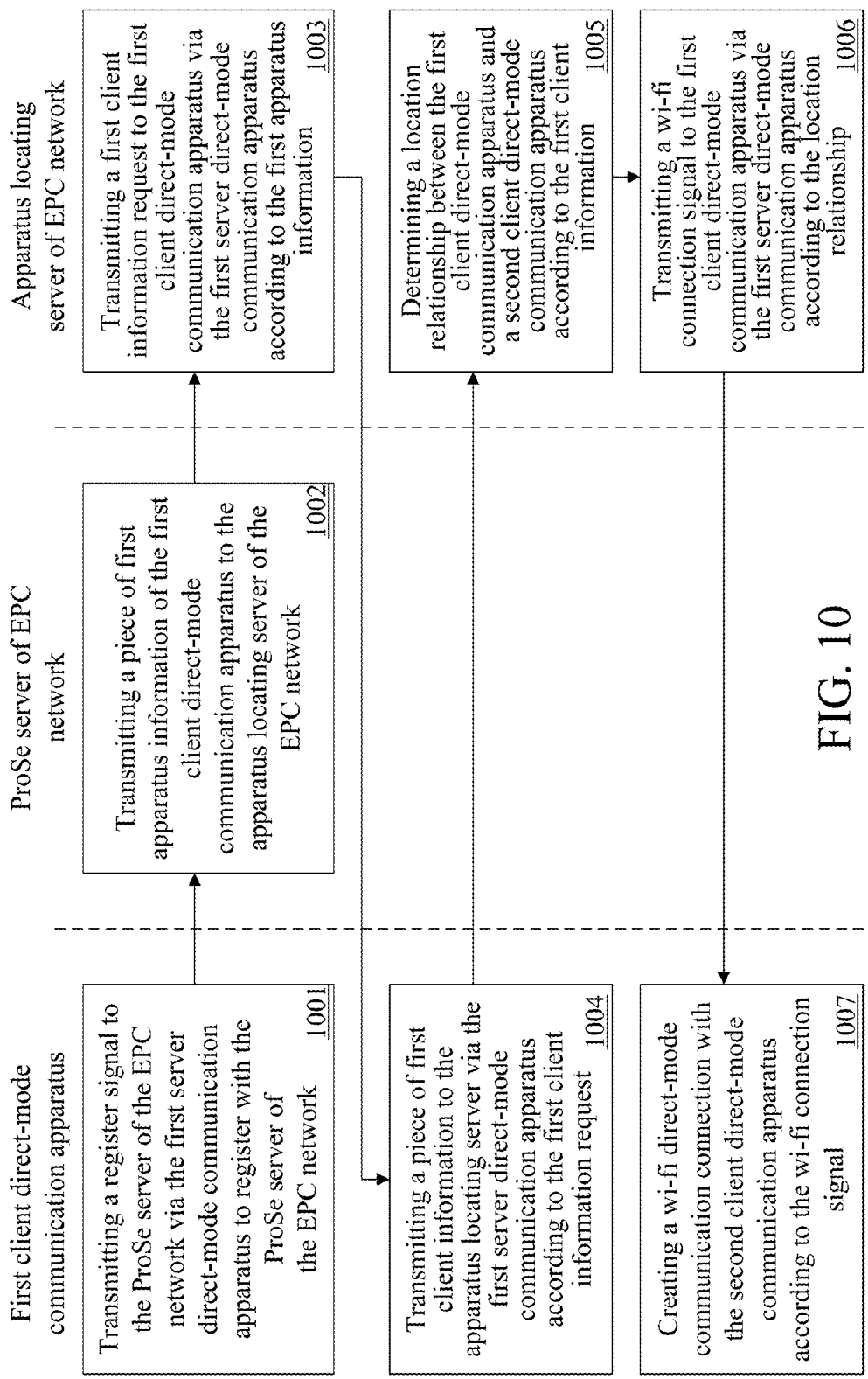
FIG. 10 is a flowchart diagram of a communication attaching method according to a tenth embodiment of the present invention.

A tenth embodiment of the present invention is a communication attaching method, a flowchart diagram of which is shown with reference to FIG. 10. The method of the tenth embodiment is for use in a direct-mode communication system (e.g., the direct-mode communication system 4 of the aforesaid embodiment) as well as a first client direct-mode communication apparatus, a first server direct-mode communication apparatus and a backhaul network (e.g., the first client direct-mode communication apparatus 11, the backhaul network 15 and the first server direct-mode communication apparatus 17 of the aforesaid embodiments) comprised in the direct-mode communication system. The first client direct-mode communication apparatus connects with the backhaul network via the first server direct-mode communication apparatus. The backhaul network of the tenth embodiment is an EPC network which comprises a 3GPP AAA server and an apparatus locating server. The detailed steps of the tenth embodiment are as follows.

Firstly, step 1001 is executed to enable the first client direct-mode communication apparatus to transmit a register signal to the 3GPP AAA server of the EPC network via the first server direct-mode communication apparatus to register with the 3GPP AAA server. Then, step 1002 is executed to enable the 3GPP AAA server of the EPC network to transmit a piece of first apparatus information of the first client direct-mode communication apparatus to the apparatus locating server of the EPC network after the first client direct-mode communication apparatus is registered. Next, step 1003 is executed to enable the apparatus locating server of the EPC network to transmit a first client information request to the first client direct-mode communication apparatus via the first server direct-mode communication apparatus according to the first apparatus information.

Subsequently, step 1004 is executed to enable the first client direct-mode communication apparatus to transmit a piece of first client information to the apparatus locating server via the first server direct-mode communication apparatus according to the first client information request. Then, step 1005 is executed immediately to enable the apparatus locating server of the EPC network to determine a location relationship between the first client direct-mode communication apparatus and a second client direct-mode communication apparatus according to the first client information. Next, step 1006 is executed to enable the apparatus locating server of the EPC network to transmit a wi-fi connection signal to the first client direct-mode communication apparatus via the first server direct-mode communication apparatus according to the location relationship.

Finally, step 1007 is executed to enable the first client direct-mode communication apparatus to create a wi-fi direct-mode communication connection with the second client direct-mode communication apparatus according to the wi-fi connection signal. It should be appreciated that, similarly, the apparatus locating server of the tenth embodiment may be one of a ProSe server and a GMLC server. However, it is not intended to limit the implementations of the communication attaching method according to the present invention.

Figure 11:
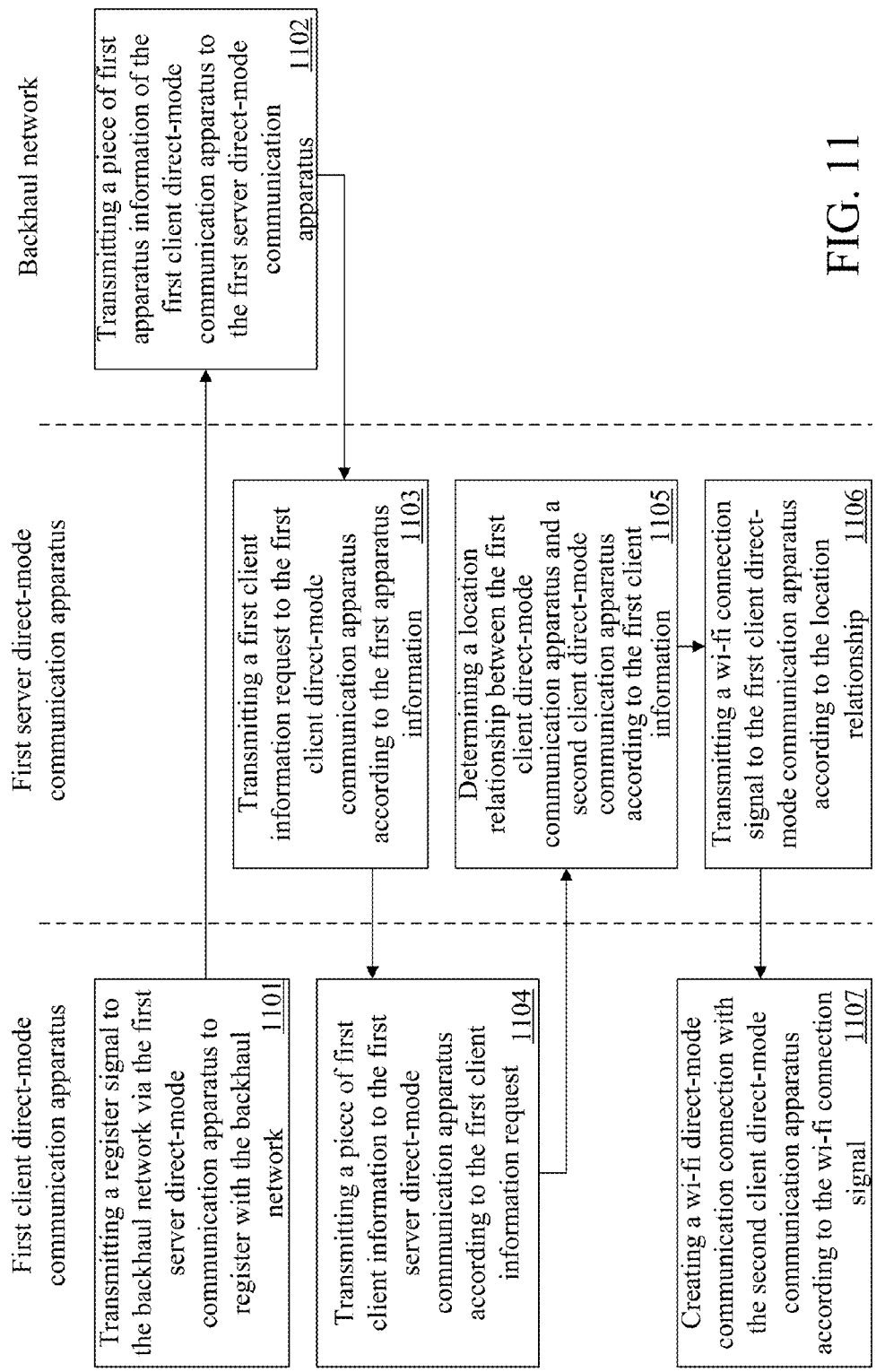
FIG. 11 is a flowchart diagram of a communication attaching method according to a eleventh embodiment of the present invention.

An eleventh embodiment of the present invention is a communication attaching method, a flowchart diagram of which is shown in FIG. 11. The method of the eleventh embodiment is for use in a direct-mode communication system (e.g., the direct-mode communication system 5 of the aforesaid embodiment) as well as a first client direct-mode communication apparatus, a first server direct-mode communication apparatus and a backhaul network (e.g., the first client direct-mode communication apparatus 11, the backhaul network 15 and the first server direct-mode communication apparatus 17 of the aforesaid embodiments) comprised in the direct-mode communication system. The first client direct-mode communication apparatus connects with the backhaul network via the first server direct-mode communication apparatus. The detailed steps of the eleventh embodiment are as follows.

Firstly, step 1101 is executed to enable the first client direct-mode communication apparatus to transmit a register signal to the backhaul network via the first server direct-mode communication apparatus to register with the backhaul network. Then, step 1102 is executed to enable the backhaul network to transmit a piece of first apparatus information to the first server direct-mode communication apparatus after the first client direct-mode communication apparatus is registered. Next, step 1103 is executed to enable the first server direct-mode communication apparatus to transmit a first client information request to the first client direct-mode communication apparatus according to the first apparatus information. Subsequently, step 1104 is executed to enable the first client direct-mode communication apparatus to transmit a piece of first client information to the first server direct-mode communication apparatus according to the first client information request.

Then, step 1105 is executed immediately to enable the first server direct-mode communication apparatus to determine a location relationship between the first client direct-mode communication apparatus and a second client direct-mode communication apparatus according to the first client information. Next, step 1106 is executed to enable the first server direct-mode communication apparatus to transmit a wi-fi connection signal to the first client direct-mode communication apparatus according to the location relationship. Finally, step 1107 is executed to enable the first client direct-mode communication apparatus to create a wi-fi direct-mode communication connection with the second client direct-mode communication apparatus according to the wi-fi connection signal.

Figure 12:
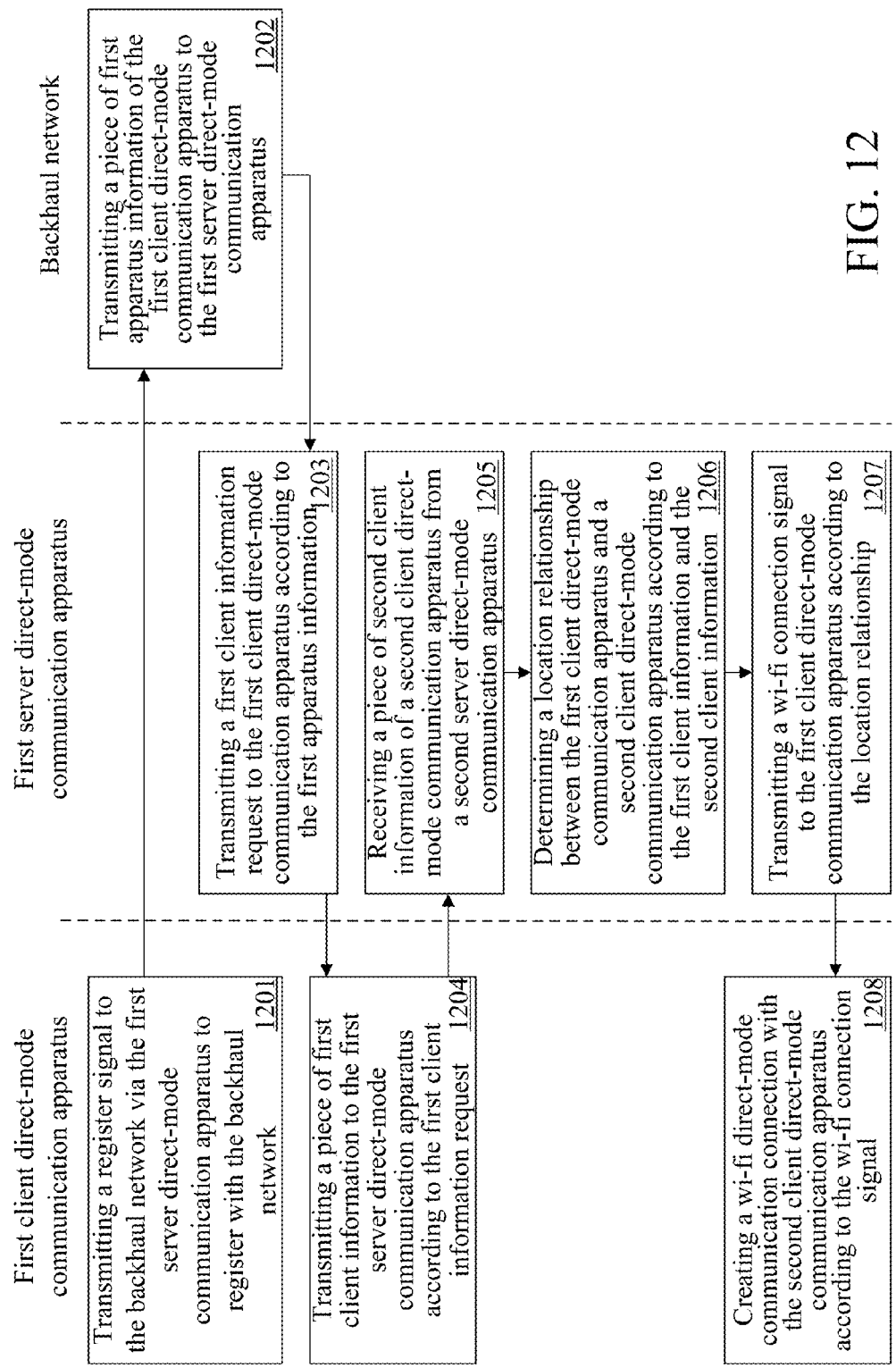
FIG. 12 is a flowchart diagram of a communication attaching method according to a twelfth embodiment of the present invention.

A twelfth embodiment of the present invention is a communication attaching method, a flowchart diagram of which is shown in FIG. 12. The method of the twelfth embodiment is for use in a direct-mode communication system (e.g., the direct-mode communication system 6 of the aforesaid embodiment) as well as a first client direct-mode communication apparatus, a first server direct-mode communication apparatus and a backhaul network (e.g., the first client direct-mode communication apparatus 11, the backhaul network 15 and the first server direct-mode communication apparatus 17 of the aforesaid embodiments) comprised in the direct-mode communication system. The first client direct-mode communication apparatus connects with the backhaul network via the first server direct-mode communication apparatus. The detailed steps of the twelfth embodiment are as follows.

Firstly, step 1201 is executed to enable the first client direct-mode communication apparatus to transmit a register signal to the backhaul network via the first server direct-mode communication apparatus to register with the backhaul network. Then, step 1202 is executed to enable the backhaul network to transmit a piece of first apparatus information to the first server direct-mode communication apparatus after the first client direct-mode communication apparatus is registered. Next, step 1203 is executed to enable the first server direct-mode communication apparatus to transmit a first client information request to the first client direct-mode communication apparatus according to the first apparatus information.

Subsequently, step 1204 is executed to enable the first client direct-mode communication apparatus to transmit a piece of first client information to the first server direct-mode communication apparatus according to the first client information request. Then, step 1205 is executed immediately to enable the first server direct-mode communication apparatus to receive a piece of second client information of a second client direct-mode communication apparatus from a second server direct-mode communication apparatus.

Next, step 1206 is executed to enable the first server direct-mode communication apparatus to determine a location relationship between the first client direct-mode communication apparatus and the second client direct-mode communication apparatus according to the first client information and the second client information. Then, step 1207 is executed to enable the first server direct-mode communication apparatus to transmit a wi-fi connection signal to the first client direct-mode communication apparatus according to the location relationship. Finally, step 1208 is executed to enable the first client direct-mode communication apparatus to create a wi-fi direct-mode communication connection with the second client direct-mode communication apparatus according to the wi-fi connection signal.

According to the above descriptions, the client direct-mode communication apparatuses of the present invention can directly create a communication connection therebetween more efficiently through use of the existing wi-fi hardware modules of the apparatuses but through adjustment of the communication protocol. In other words, with the present invention, the need of an additional connection module and an additional communication protocol in the apparatuses is eliminated, thereby increasing the flexibility in use of the apparatuses.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A communication attaching method for use in a direct-mode communication system, the direct-mode communication system comprising a first client direct-mode communication apparatus and a backhaul network which is an Evolved Packet Core (EPC) network comprising a proximity service (ProSe) server, and the first client direct-mode communication apparatus connecting with the backhaul network, the communication attaching method comprising:
   (a) enabling the first client direct-mode communication apparatus to transmit a register signal to the ProSe server of the EPC network to register with the ProSe server;
   (b) enabling the ProSe server of the EPC network to determine a location relationship between the first client direct-mode communication apparatus and a second client direct-mode communication apparatus after the step (a);
   (c) enabling the ProSe server of the EPC network to transmit a wi-fi connection signal to the first client direct-mode communication apparatus according to the location relationship; and
   (d) enabling the first client direct-mode communication apparatus to create a wi-fi direct-mode communication connection with the second client direct-mode communication apparatus according to the wi-fi connection signal.

2. The communication attaching method as claimed in claim 1, wherein the direct-mode communication system further comprises a first server direct-mode communication apparatus, the first client direct-mode communication apparatus connects to the backhaul network via the first server direct-mode communication apparatus, and the step (a) further comprises:
   (a1) enabling the first client direct-mode communication apparatus to transmit the register signal to the ProSe server of the EPC network via the first server direct-mode communication apparatus to register with the ProSe server;
   wherein the step (c) further comprises:
   (c1) enabling the ProSe server of the EPC network to transmit the wi-fi connection signal to the first client direct-mode communication apparatus via the first server direct-mode communication apparatus according to the location relationship.

3. A communication attaching method for use in a direct-mode communication system, the direct-mode communication system comprising a first client direct-mode communication apparatus and the backhaul network which is an EPC network comprising an apparatus locating server and a 3GPP AAA ($3^{rd}$ Generation Partnership Project Authentication Authorization and Accounting) server, and the first client direct-mode communication apparatus connecting with the backhaul network, the communication attaching method comprising:

(a) enabling the first client direct-mode communication apparatus to transmit a register signal to the 3GPP AAA server of the EPC network to register with the 3GPP AAA server;

(b1) enabling the 3GPP AAA server of the EPC network to transmit a piece of first apparatus information of the first client direct-mode communication apparatus to the apparatus locating server of the EPC network after the step (a);

(b2) enabling the apparatus locating server of the EPC network to transmit a first client information request to the first client direct-mode communication apparatus according to the first apparatus information;

(b3) enabling the first client direct-mode communication apparatus to transmit a piece of first client information to the apparatus locating server according to the first client information request;

(b4) enabling the apparatus locating server of the EPC network to determine the location relationship between the first client direct-mode communication apparatus and the second client direct-mode communication apparatus according to the first client information;

(c) enabling the apparatus locating server of the EPC network to transmit a wi-fi connection signal to the first client direct-mode communication apparatus according to the location relationship;

(d) enabling the first client direct-mode communication apparatus to create a wi-fi direct-mode communication connection with the second client direct-mode communication apparatus according to the wi-fi connection signal.

4. The communication attaching method as claimed in claim 3, wherein the direct-mode communication system further comprises a first server direct-mode communication apparatus, the first client direct-mode communication apparatus connects to the backhaul network via the server direct-mode communication apparatus, and step (a) further comprises:

(a1) enabling the first client direct-mode communication apparatus to transmit the register signal to the 3GPP AAA server of the EPC network via the first server direct-mode communication apparatus to register with the 3GPP AAA server;

wherein step (b2) further comprises:

(b21) enabling the apparatus locating server of the EPC network to transmit the first client information request to the first client direct-mode communication apparatus via the first server direct-mode communication apparatus according to the first apparatus information;

wherein step (b3) further comprises:

(b31) enabling the first client direct-mode communication apparatus to transmit a piece of first client information to the apparatus locating server via the first server direct-mode communication apparatus according to the first client information request;

wherein step (c) further comprises:

(c1) enabling the apparatus locating server of the EPC network to transmit the wi-fi connection signal to the first client direct-mode communication apparatus via the first server direct-mode communication apparatus according to the location relationship;

wherein the apparatus locating server is one of a ProSe server and a Gateway Mobile Location Center (GMLC) server.

5. A communication attaching method for use in a direct-mode communication system, the direct-mode communication system comprising a first client direct-mode communication apparatus, a first server direct-mode communication apparatus and a backhaul network, and the first client direct-mode communication apparatus connecting with the backhaul network via the first server direct-mode communication apparatus, the communication attaching method comprising:

(a) enabling the first client direct-mode communication apparatus to transmit a register signal to the backhaul network via the first server direct-mode communication apparatus to register with the backhaul network;

(b) enabling the backhaul network to transmit a piece of first apparatus information to the first server direct-mode communication apparatus after the step (a);

(c) enabling the first server direct-mode communication apparatus to transmit a first client information request to the first client direct-mode communication apparatus according to the first apparatus information;

(d) enabling the first client direct-mode communication apparatus to transmit a piece of first client information to the first server direct-mode communication apparatus according to the first client information request;

(e) enabling the first server direct-mode communication apparatus to determine a location relationship between the first client direct-mode communication apparatus and a second client direct-mode communication apparatus according to the first client information;

(f) enabling the first server direct-mode communication apparatus to transmit a wi-fi connection signal to the first client direct-mode communication apparatus according to the location relationship; and (g) enabling the first client direct-mode communication apparatus to create a wi-fi direct-mode communication connection with the second client direct-mode communication apparatus according to the wi-fi connection signal.

6. communication attaching method as claimed in claim 5, wherein the step (e) further comprises:

(e1) enabling the first server direct-mode communication apparatus to receive a piece of second client information of the second client direct-mode communication apparatus from a second server direct-mode communication apparatus; and (e2) enabling the first server direct-mode communication apparatus to determine the location relationship between the first client direct-mode communication apparatus and the second client direct-mode communication apparatus according to the first client information and the second client information.

7. A direct-mode communication system, comprising:
a backhaul network which is an Evolved Packet Core (EPC) network comprising a proximity service (ProSe) server; and
a first client direct-mode communication apparatus connecting with the backhaul network;
wherein the first client direct-mode communication apparatus transmits a register signal to the ProSe server of the EPC network to register with the ProSe server, the ProSe server of the EPC network determines a location relationship between the first client direct-mode communication apparatus and a second client direct-mode communication apparatus after the first client direct-mode communication apparatus has been registered and transmits a wi-fi connection signal to the first client direct-mode communication apparatus according to the location relationship, and the first client direct-mode communication apparatus creates a wi-fi direct-mode communication connection with the second client direct-mode communication apparatus according to the wi-fi connection signal.

8. The direct-mode communication system as claimed in claim 7, further comprising:
a first server direct-mode communication apparatus that connects to the backhaul network via the first server direct-mode communication apparatus;
wherein the first client direct-mode communication apparatus further transmits the register signal to the ProSe server of the EPC network via the first server direct-mode communication apparatus to register with the ProSe server, and the ProSe server of the EPC network further transmits the wi-fi connection signal to the first client direct-mode communication apparatus via the first server direct-mode communication apparatus according to the location relationship.

9. A direct-mode communication system, comprising:
a backhaul network which is an EPC network comprising an apparatus locating server and a 3GPP AAA server; and
a first client direct-mode communication apparatus connecting with the backhaul network;
wherein the first client direct-mode communication apparatus transmits a register signal to the 3GPP AAA server of the EPC network to register with the 3GPP AAA server, the 3GPP AAA server of the EPC network transmits a piece of first apparatus information of the first client direct-mode communication apparatus to the apparatus locating server of the EPC network after the first client direct-mode communication apparatus has been registered, the apparatus locating server of the EPC network transmits a first client information request to the first client direct-mode communication apparatus according to the first apparatus information, the first client direct-mode communication apparatus transmits a piece of first client information to the apparatus locating server according to the first client information request, the apparatus locating server of the EPC network determines the location relationship between the first client direct-mode communication apparatus and the second client direct-mode communication apparatus according to the first client information, the apparatus locating server of the EPC network transmits a wi-fi connection signal to the first client direct-mode communication apparatus according to the location relationship, and the first client direct-mode communication apparatus creates a wi-fi direct-mode communication connection with the second client direct-mode communication apparatus according to the wi-fi connection signal.

10. The direct-mode communication system as claimed in claim 9, further comprising a first server direct-mode communication apparatus, wherein the first client direct-mode communication apparatus connects to the backhaul network via the server direct-mode communication apparatus, the first client direct-mode communication apparatus further transmits the register signal to the 3GPP AAA server of the EPC network via the first server direct-mode communication apparatus to register with the 3GPP AAA server, the apparatus locating server of the EPC network further transmits the first client information request to the first client direct-mode communication apparatus via the first server direct-mode communication apparatus according to the first apparatus information, the first client direct-mode communication apparatus further transmits a piece of first client information to the apparatus locating server via the first server direct-mode communication apparatus according to the first client information request, the apparatus locating server of the EPC network further transmits the wi-fi connection signal to the first client direct-mode communication apparatus via the first server direct-mode communication apparatus according to the location relationship, and the apparatus locating server is one of a ProSe server and a GMLC server.

11. A direct-mode communication system, comprising:
a backhaul network;
a first client direct-mode communication apparatus; and
a first server direct-mode communication apparatus, the first client direct-mode communication apparatus connecting with the backhaul network via the first server direct-mode communication apparatus;
wherein the first client direct-mode communication apparatus transmits a register signal to the backhaul network via the first server direct-mode communication apparatus to register with the backhaul network, the backhaul network transmits a piece of first apparatus information to the first server direct-mode communication apparatus after the first client direct-mode communication apparatus has been registered, the first server direct-mode communication apparatus transmits a first client information request to the first client direct-mode communication apparatus according to the first apparatus information, the first client direct-mode communication apparatus transmits a piece of first client information to the first server direct-mode communication apparatus according to the first client information request, the first server direct-mode communication apparatus determines a location relationship between the first client direct-mode communication apparatus and a second client direct-mode communication apparatus according to the first client information, the first server direct-mode communication apparatus transmits a wi-fi connection signal to the first client direct-mode communication apparatus according to the location relationship, and the first client direct-mode communication apparatus creates a wi-fi direct-mode communication connection with the second client direct-mode communication apparatus according to the wi-fi connection signal.

12. The direct-mode communication system as claimed in claim 11, wherein the first server direct-mode communication apparatus further receives a piece of second client information of the second client direct-mode communication apparatus from a second server direct-mode communication apparatus, and the first server direct-mode communication apparatus determines the location relationship between the first client direct-mode communication apparatus and the second client direct-mode communication apparatus according to the first client information and the second client information.

13. A communication attaching method for use in a first client direct-mode communication apparatus, the first client direct-mode communication apparatus being used in a direct-mode communication system, the direct-mode communication system further comprising a backhaul network which is an Evolved Packet Core (EPC) network comprising a proximity service (ProSe) server, and the first client direct-mode communication apparatus connecting with the backhaul network, the communication attaching method comprising:

(a) enabling the first client direct-mode communication apparatus to transmit a register signal to the ProSe server of the EPC network to register with the ProSe server so that the ProSe server of the EPC network determines a location relationship between the first client direct-mode communication apparatus and a second client direct-mode communication apparatus and transmits a wi-fi connection signal to the first client direct-mode communication apparatus according to the location relationship;

(b) enabling the first client direct-mode communication apparatus to receive the wi-fi connection signal from the ProSe server of the EPC network; and (c) enabling the first client direct-mode communication apparatus to create a wi-fi direct-mode communication connection with the second client direct-mode communication apparatus according to the wi-fi connection signal.

14. The communication attaching method as claimed in claim 13, wherein the direct-mode communication system further comprises a server direct-mode communication apparatus, the first client direct-mode communication apparatus connects to the backhaul network via the server direct-mode communication apparatus, and the step (a) further comprises:

(a1) enabling the first client direct-mode communication apparatus to transmit the register signal to the ProSe server of the EPC network via the server direct-mode communication apparatus to register with the ProSe server;

wherein the step (b) further comprises:

(b1) enabling the first client direct-mode communication apparatus to receive the wi-fi connection signal from the ProSe server of the EPC network via the server direct-mode communication apparatus.

15. A communication attaching method for use in a first client direct-mode communication apparatus, the first client direct-mode communication apparatus being used in a direct-mode communication system, the direct-mode communication system further comprising a server direct-mode communication apparatus and a backhaul network, and the first client direct-mode communication apparatus connecting with the backhaul network via the server direct-mode communication apparatus, the communication attaching method comprising:

(a) enabling the first client direct-mode communication apparatus to transmit a register signal to the backhaul network via the server direct-mode communication apparatus to register with the backhaul network so that the backhaul network transmits a piece of first apparatus information to the server direct-mode communication apparatus after the first client direct-mode communication apparatus has been registered, and the server direct-mode communication apparatus transmits a first client information request to the first client direct-mode communication apparatus according to the first apparatus information;

(b) enabling the first client direct-mode communication apparatus to transmit a piece of first client information to the server direct-mode communication apparatus according to the first client information request so that the server direct-mode communication apparatus determines a location relationship between the first client direct-mode communication apparatus and a second client direct-mode communication apparatus according to the first client information and transmits a wi-fi connection signal to the first client direct-mode communication apparatus according to the location relationship;

(c) enabling the first client direct-mode communication apparatus to receive the wi-fi connection signal from the server direct-mode communication apparatus; and (d) enabling the first client direct-mode communication apparatus to create a wi-fi direct-mode communication connection with the second client direct-mode communication apparatus according to the wi-fi connection signal.

16. A first client direct-mode communication apparatus for use in a direct-mode communication system, the direct-mode communication system further comprising a backhaul network which is an Evolved Packet Core (EPC) network comprising a proximity service (ProSe) server, and the first client direct-mode communication apparatus connecting with the backhaul network, the first client direct-mode communication apparatus comprising:

a processor; and a transceiver;

wherein the transceiver is configured to transmit a register signal to the ProSe server of the EPC network to register with the ProSe server so that the ProSe server of the EPC network determines a location relationship between the first client direct-mode communication apparatus and a second client direct-mode communication apparatus and transmits a wi-fi connection signal to the first client direct-mode communication apparatus according to the location relationship, the transceiver is further configured to receive the wi-fi connection signal from the ProSe server of the EPC network, and the processor is configured to create a wi-fi direct-mode communication connection with the second client direct-mode communication apparatus via the transceiver according to the wi-fi connection signal.

17. The first client direct-mode communication apparatus as claimed in claim 16, wherein the direct-mode communication system further comprises a server direct-mode communication apparatus, the first client direct-mode communication apparatus connects to the backhaul network via the server direct-mode communication apparatus, and the transceiver is further configured to transmit the register signal to the ProSe server of the EPC network via the server direct-mode communication apparatus to register with the ProSe server, and to receive the wi-fi connection signal from the ProSe server of the EPC network via the server direct-mode communication apparatus.

18. A first client direct-mode communication apparatus for use in a direct-mode communication system, the direct-mode communication system further comprising a server direct-mode communication apparatus and a backhaul network, and the first client direct-mode communication apparatus connecting with the backhaul network via the server direct-mode communication apparatus, the first client direct-mode communication apparatus comprising:

a processor; and a transceiver;

wherein the transceiver is configured to transmit a register signal to the backhaul network via the server direct-mode communication apparatus to register with the backhaul network so that the backhaul network transmits a piece of first apparatus information to the server direct-mode communication apparatus after the first client direct-mode communication apparatus has been registered, and the server direct-mode communication apparatus transmits a first client information request to the transceiver according to the first apparatus information, the transceiver is further configured to transmit a piece of first client information to the server direct-mode communication apparatus according to the first client information request so that the server direct-mode communication apparatus determines a location relationship between the first client direct-mode communication apparatus and a second client direct-mode communication apparatus according to the first client information and transmits a wi-fi connection signal to the first client direct-mode communication apparatus according to the location relationship, the transceiver is further configured to receive the wi-fi connection signal from the server direct-mode communication apparatus, and the processor is configured to create a wi-fi direct-mode communication connection with the second client direct-mode communication apparatus according to the wi-fi connection signal.

19. A communication attaching method for use in a backhaul network, the backhaul network being an EPC network, which comprises a ProSe server, and used in a direct-mode communication system, the direct-mode communication system further comprising a first client direct-mode communication apparatus, and the first client direct-mode communication apparatus connecting with the backhaul network, the communication attaching method comprising:
(a) enabling the ProSe server of the EPC network to receive a register signal from the first client direct-mode communication apparatus and to register the first client direct-mode communication apparatus;
(b) enabling the ProSe server of the EPC network to determine a location relationship between the first client direct-mode communication apparatus and a second client direct-mode communication apparatus after the step (a); and
(c) enabling the ProSe server of the EPC network to transmit a wi-fi connection signal to the first client direct-mode communication apparatus according to the location relationship so that the first client direct-mode communication apparatus creates a wi-fi direct-mode communication connection with the second client direct-mode communication apparatus according to the wi-fi connection signal.

20. The communication attaching method as claimed in claim 19, wherein the direct-mode communication system further comprises a first server direct-mode communication apparatus, the first client direct-mode communication apparatus connects to the backhaul network via the first server direct-mode communication apparatus, and the step (a) further comprises:
(a1) enabling the ProSe server of the EPC network to receive the register signal from the first client direct-mode communication apparatus via the first server direct-mode communication apparatus and register the first client direct-mode communication apparatus;
wherein the step (c) further comprises:
(c1) enabling the ProSe server of the EPC network to transmit the wi-fi connection signal to the first client direct-mode communication apparatus via the first server direct-mode communication apparatus according to the location relationship so that the first client direct-mode communication apparatus creates the wi-fi direct-mode communication connection with the second client direct-mode communication apparatus according to the wi-fi connection signal.

21. A communication attaching method for use in a backhaul network, the backhaul network being an EPC network, which comprises an apparatus locating server and a 3GPP AAA server, and used in a direct-mode communication system, the direct-mode communication system further comprising a first client direct-mode communication apparatus, and the first client direct-mode communication apparatus connecting with the backhaul network, the communication attaching method comprising:
(a) enabling the 3GPP AAA server of the EPC network to receive a register signal from the first client direct-mode communication apparatus and register the first client direct-mode communication apparatus;
(b1) enabling the 3GPP AAA server of the EPC network to transmit a piece of first apparatus information of the first client direct-mode communication apparatus to the apparatus locating server of the EPC network after the step (a);
(b2) enabling the apparatus locating server of the EPC network to transmit a first client information request to the first client direct-mode communication apparatus according to the first apparatus information so that the first client direct-mode communication apparatus transmits a piece of first client information to the apparatus locating server according to the first client information request; and
(b3) enabling the apparatus locating server of the EPC network to determine the location relationship between the first client direct-mode communication apparatus and the second client direct-mode communication apparatus according to the first client information;
(c) enabling the apparatus locating server of the EPC network to transmit the wi-fi connection signal to the first client direct-mode communication apparatus according to the location relationship so that the first client direct-mode communication apparatus creates the wi-fi direct-mode communication connection with the second client direct-mode communication apparatus according to the wi-fi connection signal.

22. The communication attaching method as claimed in claim 21, wherein the direct-mode communication system further comprises a first server direct-mode communication apparatus, the first client direct-mode communication apparatus connects to the backhaul network via the server direct-mode communication apparatus, and step (a) further comprises:
(a1) enabling the 3GPP AAA server of the EPC network to receive the register signal from the first client direct-mode communication apparatus via the first server direct-mode communication apparatus and register the first client direct-mode communication apparatus;
wherein step (b2) further comprises:
(b21) enabling the apparatus locating server of the EPC network to transmit the first client information request to the first client direct-mode communication apparatus via the first server direct-mode communication apparatus according to the first apparatus information so that the first client direct-mode communication apparatus transmits the piece of first client information to the apparatus locating server via the first server direct-mode communication apparatus according to the first client information request;
wherein step (c) further comprises:
(c1) enabling the apparatus locating server of the EPC network to transmit the wi-fi connection signal to the first client direct-mode communication apparatus via the first server direct-mode communication apparatus according to the location relationship so that the first client direct-mode communication apparatus creates the wi-fi direct-mode communication connection with the second client direct-mode communication apparatus according to the wi-fi connection signal;

wherein the apparatus locating server is one of a ProSe server and a GMLC server.

* * * * *